No. 674,701. Patented May 21, 1901.
W. M. KELSO.
ANTISEPTIC APPARATUS.
(Application filed Oct. 4, 1899.)
(No Model.)
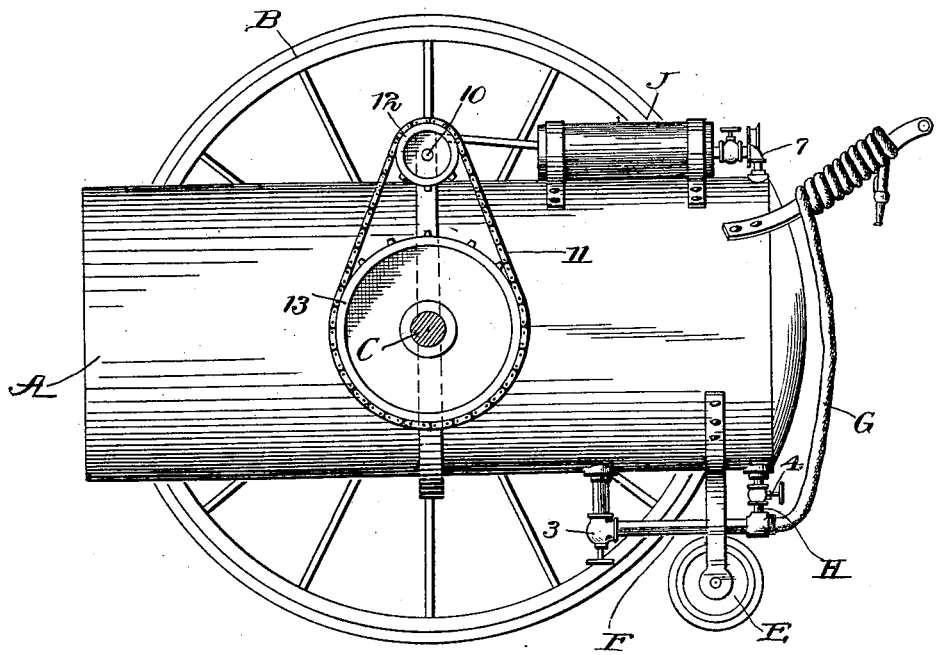
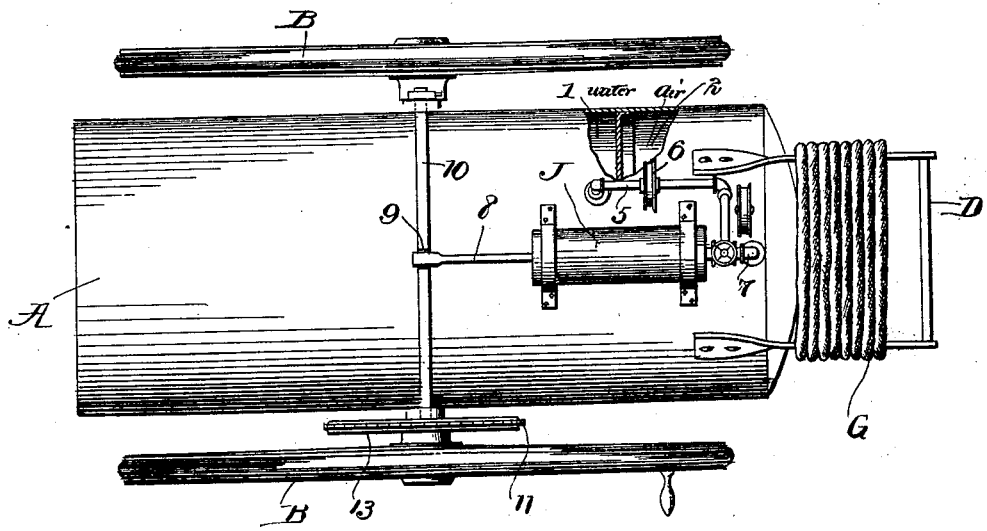

UNITED STATES PATENT OFFICE.

WILBER M. KELSO, OF CHICAGO, ILLINOIS.

ANTISEPTIC APPARATUS.

SPECIFICATION forming part of Letters Patent No. 674,701, dated May 21, 1901.

Original application filed June 4, 1898, Serial No. 682,588. Divided and this application filed October 4, 1899. Serial No. 732,506. (No model.)

*To all whom it may concern:*

Be it known that I, WILBER M. KELSO, a citizen of the United States of America, and a resident of Chicago, in the county of Cook and State of Illinois, have invented certain new and useful Improvements in Antiseptic Apparatus, of which the following is a specification.

My invention relates to devices or machinery for sprinkling, spraying, or atomizing liquid solutions.

The object of my invention is to provide a simple, effective, and inexpensive apparatus of the kind set forth capable of being moved about from place to place by hand.

This application is a division of an application filed by me on June 4, 1898, Serial No. 682,588, and embodies and claims a manually-operable antiseptic device illustrated and described in said application.

In the accompanying drawings, Figure 1 is a side elevation of a hand-propelled antiseptic-machine embodying my invention with one of its wheels removed for convenience of illustration. Fig. 2 is a plan view of the same with a part of the device broken away.

The device shown in the drawings involves a cylindrical tank or reservoir A, which is arranged horizontally and is supported and carried by the wheels B B on the axle C. The rear end of the tank or reservoir A is provided with a handle D, by which the vehicle can be propelled over the ground. A small wheel E is attached to the lower surface of the same end of such tank or reservoir, so as to provide a rest therefor when the vehicle is stationary.

In accordance with the invention of my said other application the tank or reservoir A is divided transversely into a water-compartment 1 and an air-compartment 2, Fig. 2. The water-compartment 1 is understood to be for the solution which it is desired to spray, and the air-compartment is to contain air under pressure. The water-compartment 1 is connected by means of a relatively large pipe F, having a valve 3, to the outside of the hose G, which is understood to be double or, in other words, to be composed of interior and exterior tubes, in accordance with the invention of my said other application and as fully illustrated, described, and claimed in said application. The air-compartment 2 is connected by means of a relatively small pipe H, having a valve 4, with the interior tube of the hose G, it being understood that the hose G is provided with a nozzle capable of allowing the exit of both air and solution for spraying purposes and also capable of being adjusted to vary the proportion of air and solution, as also fully set forth in my said other application. By such arrangement the solution can be sprayed as desired by means of the hose and the nozzle thereon.

Upon the top of the tank or reservoir A is arranged a suitable air-pump J, which is connected to the solution-compartment 1 by a pipe 5, having a gage 6, and to the air-compartment 2 by a pipe 7. By such arrangement the compressed air can be forced into both the solution and air compartments, so as to produce the desired pressure in both for performing the spraying operation. The pump J is operated by a piston-rod 8, and the latter is in turn operated by a crank 9 on the shaft 10, supported above the tank or reservoir A. The shaft 10 is rotated by any suitable power-transmitting connection—such, for example, as the sprocket-chain 11, gearing with the sprocket-wheels 12 and 13, respectively, on the shaft 10 and axle C.

It will be seen that by this arrangement and construction the vehicle can be propelled by one hand and the spraying performed by the other, and while the vehicle is being so propelled air will be automatically compressed and forced into the two compartments of the tank or reservoir, so as to furnish abundant pressure for spraying.

What I claim as my invention is—

In a wheeled antiseptic apparatus having a single pair of wheels, the combination with the axle for the wheels, of a tank or reservoir supported thereby and mounted at substantially its longitudinal middle thereupon, the said tank being divided into air and solution compartments, a third wheel secured to the bottom of the rear end of the tank, a pump arranged upon the top of the rear portion of the tank, a rotary shaft having a crank connected with the pump-piston, power-transmitting connection between the wheel-axle and the said rotary shaft, a handle extended rearwardly from the rear portion of the tank, and a hose suitably connected with the air and liquid compartments of the tank, substantially as described.

Signed by me at Chicago, Illinois, this 30th day of September, 1899.

WILBER M. KELSO.

Witnesses:
   A. MILLER BELFIELD,
   E. W. APPLEGATE.